(12) United States Patent
Ganesan (10) Patent No.: US 8,838,715 B2
(45) Date of Patent: Sep. 16, 2014

(54) PROVIDING CLIENT SYSTEM SUPPORT (75) Inventor: Vidyavathi Ganesan, Bangalore (IN)

(73) Assignee: SAP AG, Walldorf (DE)

( * ) Notice: Subject to any disclaimer, the term of this patent is extended or adjusted under 35 U.S.C. 154(b) by 293 days.

(21) Appl. No.: 13/480,475

(22) Filed: May 25, 2012

(65) Prior Publication Data

US 2013/0318174 A1   Nov. 28, 2013

(51) Int. Cl.
*G06F 15/16* (2006.01)

(52) U.S. Cl.
USPC ........... 709/206; 709/202; 709/217; 709/219; 709/225; 709/226; 709/229

(58) Field of Classification Search
USPC .......... 709/202, 206, 217, 219, 225, 226, 229
See application file for complete search history.

(56) References Cited

U.S. PATENT DOCUMENTS

| 2002/0046170 | A1* | 4/2002 | Gvily | 705/42 |
|---|---|---|---|---|
| 2004/0054779 | A1* | 3/2004 | Takeshima et al. | 709/225 |
| 2006/0031520 | A1* | 2/2006 | Bedekar et al. | 709/227 |
| 2006/0235941 | A1* | 10/2006 | Arcas et al. | 709/217 |
| 2006/0253444 | A1* | 11/2006 | O'Toole et al. | 707/9 |

* cited by examiner

Primary Examiner — Liangche A Wang (57) ABSTRACT

In one embodiment, a support request message is received. Further, a check is made to determine whether a support request repository includes an analogous support request message analogous to the support request message. When the analogous support request is included in the support request repository, a response associated with the analogous support request is sent. When the analogous support request is not included in the support request repository, a client system connection associated with the support request message is determined. Furthermore, when the client system connection is established, the support request message, and a plurality of related prior support request messages and associated responses are sent to an escalation support unit. Also, a response received from the escalation support unit, and the support request message, are stored in the support request repository.

20 Claims, 9 Drawing Sheets

| SUPPORT REQUEST MESSAGE 405 | |
|---|---|
| CLIENT DETAILS 410 | SUPPORT REQUEST MESSAGE DETAILS 415 |
| MR. JOHN<br>ABC COMPANY<br><br>PHONE: 09538455573<br><br>EMAIL ID: john@abc.com | OP SYSTEM: INTEL<br><br>SOFTWARE PRODUCT: NETWEAVER VER: 7.0<br><br>SENT ON: APRIL 19, 2011 SENT AT: 15:16:19<br><br>PRIORITY: MEDIUM<br><br>STATUS: NEW |
| SUBJECT 420: TIME ERROR IN COMPONENT C21 | |
| HI,<br><br>CHECKING DATA FOR COMPONENTS C21, C22 AND C23, WE HAVE FOUND THAT THERE IS A DELAY OF 1 HOUR IN COMPONENT C21.<br><br>REGARDS,<br>JOHN  _425_ | |
| CLIENT SYSTEM CONNECTIONS 430 | |
| SYSTEM ID: UVW    USER ID: JOHN    PASSWORD: PAN99 | |

FIG. 4

| SUPPORT REQUEST MESSAGE 505 ||
|---|---|
| CLIENT DETAILS<br><br>MS. ALEX<br>XYZ COMPANY<br><br>PHONE: 038976890<br><br>EMAIL ID: alex@xyz.com | SUPPORT REQUEST MESSAGE DETAILS<br><br>OP SYSTEM: INTEL<br><br>SOFTWARE PRODUCT: NETWEAVER VER: 7.0<br><br>SENT ON: FEBRUARY 26, 2011 SENT AT: 10:30:19<br><br>PRIORITY: HIGH<br><br>STATUS: COMPLETED |

| SUBJECT 510: COMPONENT C21_TIME ERROR |
|---|
| HI TEAM,                   515<br><br>PLEASE PROVIDE A NECESSARY ACTION FOR SOLVING A TIME DELAY IN COMPONENT C21.<br><br>REGARDS,<br>ALEX |

| RESPONSE 520 |
|---|
| HI ALEX,                  525<br><br>PLEASE FOLLOW BELOW MENTIONED STEPS:<br><br>1. GOTO TX: RSAL AND EXPAND CUBE C21<br>2. OPEN TRANSFER RULE IN EDIT MODE<br>3. SELECT START DATE AND CLIENT ON ROUTINE (SQUARE BUTTON)<br>4. EDIT TRANSFER RULES MESSAGE BOX WILL APPEAR<br>5. HERE CONVERT TIME STAMP TRAN_STRUCTURE-TSTMP_START TIME XONE 1_TZONE INTO DATE 1_START_DATE<br>6. ALSO CONVERT TIME STAMP TRAN_STRUCTURE-TSTMP_START TIME XONE SY-ZONLO INTO DATE 1_START_DATE<br>7. CLICK ON SAVE BUTTON THEN GO BACK AND PRESS ENTER KEY.<br><br>REGARDS,<br>SAM |

PRIOR SUPPORT REQUEST MESSAGES 805

1. COMPONENT C21 NOTES

2. TIME STAMP ISSUES IN TECHNICAL CONTENT

3. UTC AND LOCAL SERVER TIME STAMP ISSUES

4. ERRORS IN C21

PROVIDING CLIENT SYSTEM SUPPORT

FIELD

Embodiments generally relate to information technology and more particularly to methods and systems to provide client system support.

BACKGROUND

Information technology support services have evolved to play a proactive role due to increase in the number and complexity of the software products. The information technology support services include support units to provide solution or suggestions to the issues raised by clients related to the software products. Typically, when an issue is raised by a client, support associates of the support unit strive to collect required information, determine the nature of the issue and communicate the solution to the client. Therefore, efficiency of the support unit depends heavily on the skills and expertise of the support associates.

Further, information such as issues and the associated solutions are dispersed across management systems, product manuals, developer communities and technical documentations. Moreover, many times such information is available in unstructured format and the support associates may need to spend considerable time in searching for prior related issues. The support associates may find it tedious to respond to the same kind of issues raised over time. Therefore, the support unit may not necessarily meet the 'always-on' requirements of the client. Furthermore, such a process is highly time consuming and often not reliable.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques to provide a client system support is described herein. According to various embodiments, support system refers to a system by which an organization provides a range of services to the clients pertaining to organization's products by solving specific problems associated with the products. The support system includes escalation support units to provide solutions or suggestions to the issues or problems, raised by the clients, related to the products. The issue is included in a support request message created at a client system. The escalation support units may include a plurality of support associates expertized in products of the organization.

According to one embodiment, support request messages are analyzed at a support request repository before being sent to the escalation support unit. When a support request message is received, a check is made to determine whether an analogous support request message analogous to the support request message is present in the support request repository. When the analogous support request message is present, a response associated with the analogous support request message is used to respond to the received support request message. Thereby, the escalation support unit is not involved in responding to the same kind of support request messages raised over time.

Further, when the analogous support request message is not present, a client system connection is checked to allow an escalation support unit to access a client system for responding to the support request message. Furthermore, when the client system connection is established, the support request message and related prior support request messages are sent to the escalation support unit to assist in providing a response to the support request message. In addition, the response provided by the escalation support unit is stored in the support request repository along with the support request message for future reference. Thus, the process of responding to the support request messages is made efficient.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
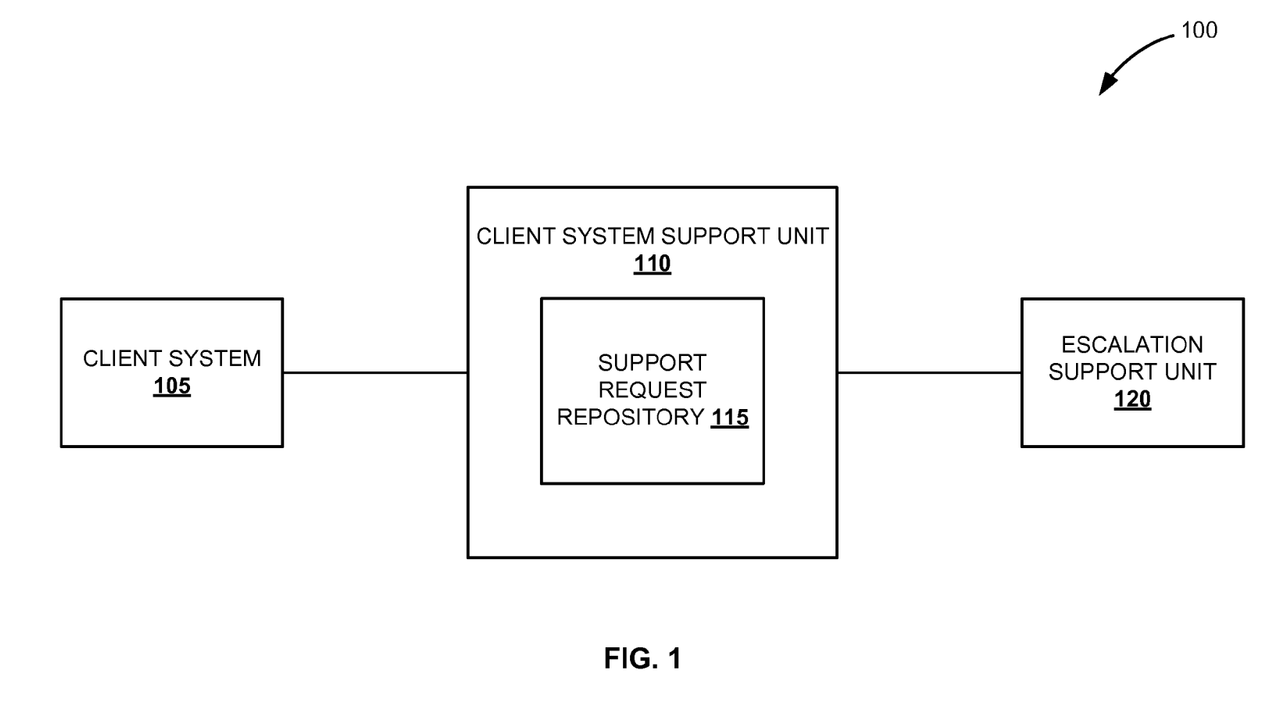
FIG. 1 is a block diagram illustrating a client system support unit, according to an embodiment.

FIG. 1 is a block diagram 100 illustrating a client system support unit (e.g., 110), according to an embodiment. The client system support unit 110 includes a support request repository 115 to store prior support request messages and associated responses. The client system support unit 110 analyses a support request message received from a client system 105 before sending to an escalation support unit 120. In one embodiment, when the support request message is received, the support request repository 115 is checked to determine whether an analogous support request message analogous to the support request message is present. The analogous support request message may be determined using a technique such as a natural language processing (NLP) technique. In other words, the analogous support request message may have a same meaning as of the support request message. The analogous support request is described with an example in FIG. 5. When the analogous support request message is present, a response associated with the analogous support request message is used to respond to the received support request message. Thereby, the same kind of support request messages raised over time is responded by the client system support unit 110 instead of the escalation support unit 120.

Further, when the analogous support request message is not present in the support request repository 115, a client system connection is checked to allow an escalation support unit 120 to access the client system 105 for responding to the support request message. When the client system connection is not established, a request message to provide client system connection information is sent to the client system 105. Further, when the client system connection is established, the support request message and related prior support request messages are sent to the escalation support unit 120. The related prior support request messages may be prior support request messages stored in the support request repository 115 dealing with similar issue as of the support request message but may not be analogous to the support request message. The related prior support request is described with an example in FIG. 8. In addition, the response provided by the escalation support unit 120 is stored in the support request repository 115 along with the support request message for future reference. Thus, the process of responding to the support request messages is made efficient.

Figure 2:
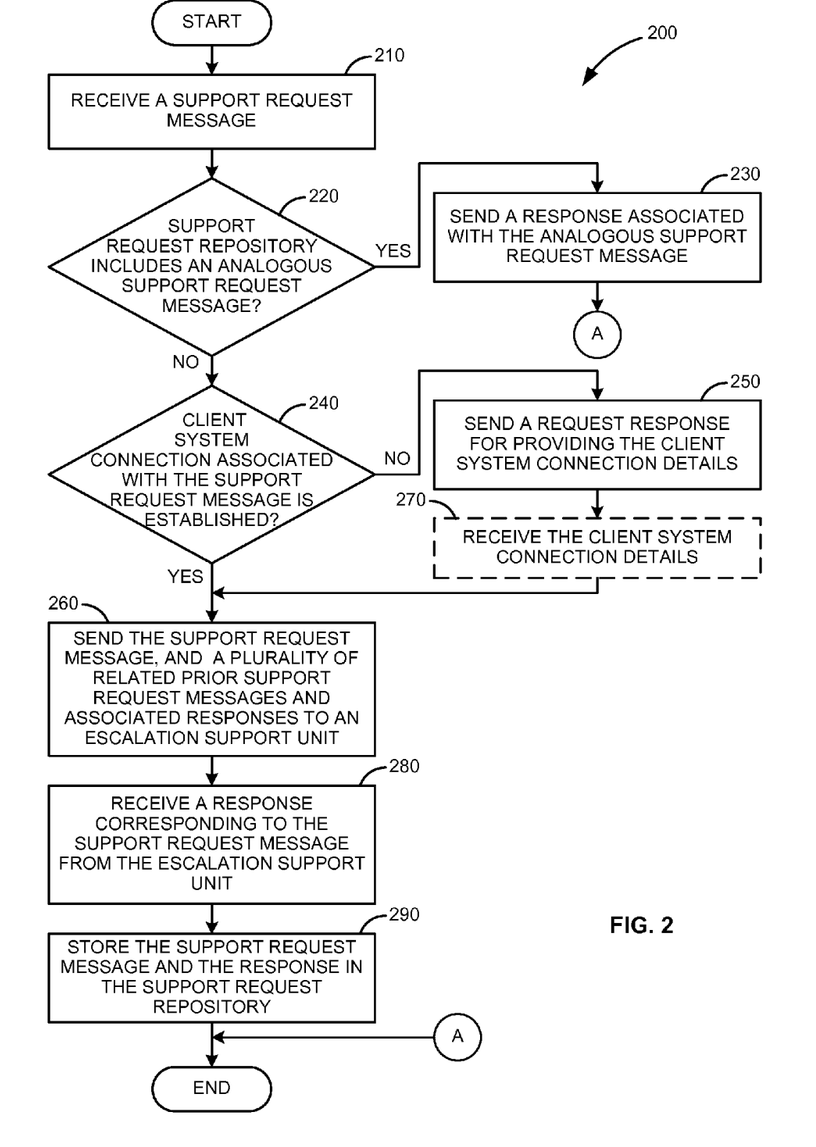
FIG. 2 is a flow diagram illustrating a method to provide client system support, according to an embodiment.

FIG. 2 is a flowchart 200 illustrating a method to provide client system support, according to an embodiment. At step 210, a support request message is received. In one exemplary embodiment, the support request message may be created at a client system. The support request message includes an issue or question related to a product. The structure of the support request message is described in greater detail in FIG. 4.

At step 220, a check is made to determine whether a support request repository includes an analogous support request message analogous to the received support request message. In one embodiment, the support request repository is an in-memory computing database including one or more prior support request messages and associated responses. Further, the analogous support request message in the support request repository is determined using natural language processing (NLP) technique. At step 230, a response associated to the analogous support message is sent to the client system. The process of determining the analogous support request message and sending the response associated with the analogous support message is described with an example in FIG. 3.

At step 240, when the analogous support request is not included in the support request repository, a check is made to determine whether a client system connection associated with the support request message to allow an escalation support unit to access the client system is established. In one exemplary embodiment, the client system connection includes log-in details of the client system. The client system connection is described in greater detail in FIG. 6.

At step 250, when the client system connection is not established, a request response for providing the client system connection details is sent to the client system. At step 260, when the client system connection is established (also, e.g., 270), the support request message is sent to an escalation support unit for analyzing the support request message and providing a response or solution to the support request message. In addition, a plurality of related prior support request messages and associated responses are sent to the escalation support unit for assisting in providing the response to the support request message. Further, the related prior support requests and associated responses are determined using techniques such as NLP technique. The related prior support requests are described in greater detail with an example in FIG. 8.

At step 280, the response corresponding to the support request message is received from the escalation support unit. The escalation support unit provides the response to the support request message using the plurality of related prior support request messages and the associated responses. At step 290, the support request message and the corresponding response are stored in the support request repository for future reference. Further, the response is sent to the client system.

Figure 3:
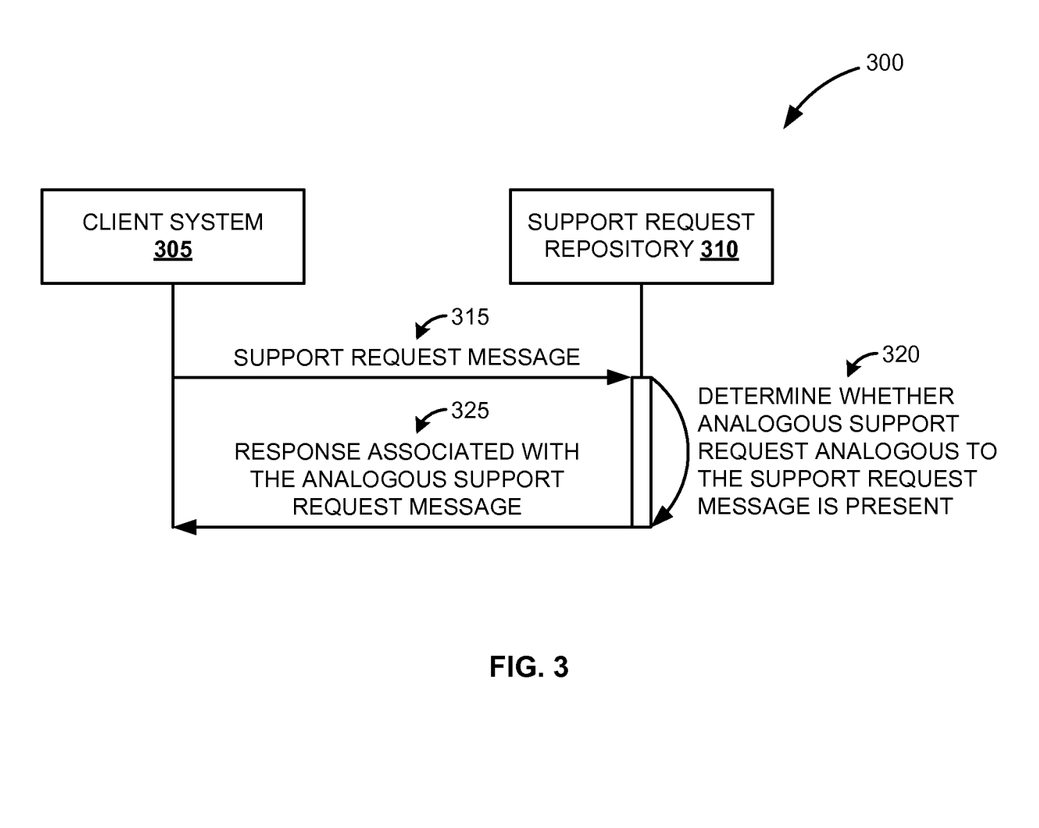
FIG. 3 is a sequence diagram illustrating an exemplary data flow between a client system and a support request repository, according to an embodiment.

FIG. 3 is a sequence diagram 300 illustrating an exemplary data flow between a client system 305 and a support request repository 310, according to an embodiment. The sequence diagram 300 represents all the interactions and the operations involved between the client system 305 and the support request repository 310. The vertical lines of the client system 305 and the support request repository 310 represent the processes that may exist simultaneously. The horizontal arrows (e.g., 315 and 325) represent the data flow steps between the vertical lines originating from their respective process objects (e.g., 305 and 310). Activation boxes between the horizontal arrows represent the process that is being performed in the respective process object. (e.g., 320).

Figure 4:
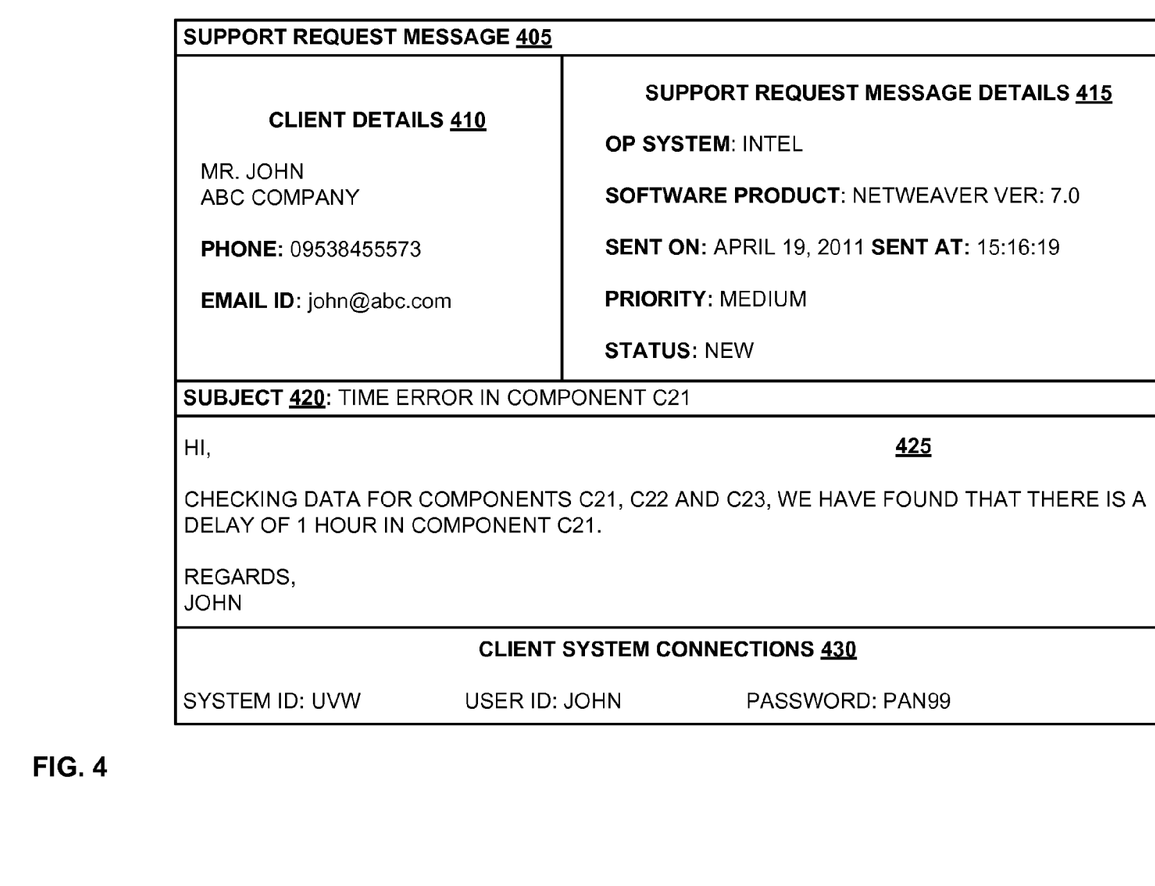
FIG. 4 is an exemplary support request message, according to an embodiment.

At step 315, a support request message is sent from the client system 305 to the support request repository 310. An example of the support request message is depicted in FIG. 4. With reference to FIG. 4, the support request message 405 includes client details 410, support request message details 415, a subject 420 (e.g., time error in product c21), a body 425 and a client system connection 430. The client details 410 include but are not limited to client's name, address of the client and contact details. The support request message details 415 include but are not limited to details of operating system of the client system, a product details to which the issue is concerned (e.g., software product name and version), date and time at which the support request message is sent, priority of the support request message (e.g., high or low or medium) and a status of the support request message (e.g., new or in process or completed).

Figure 5:
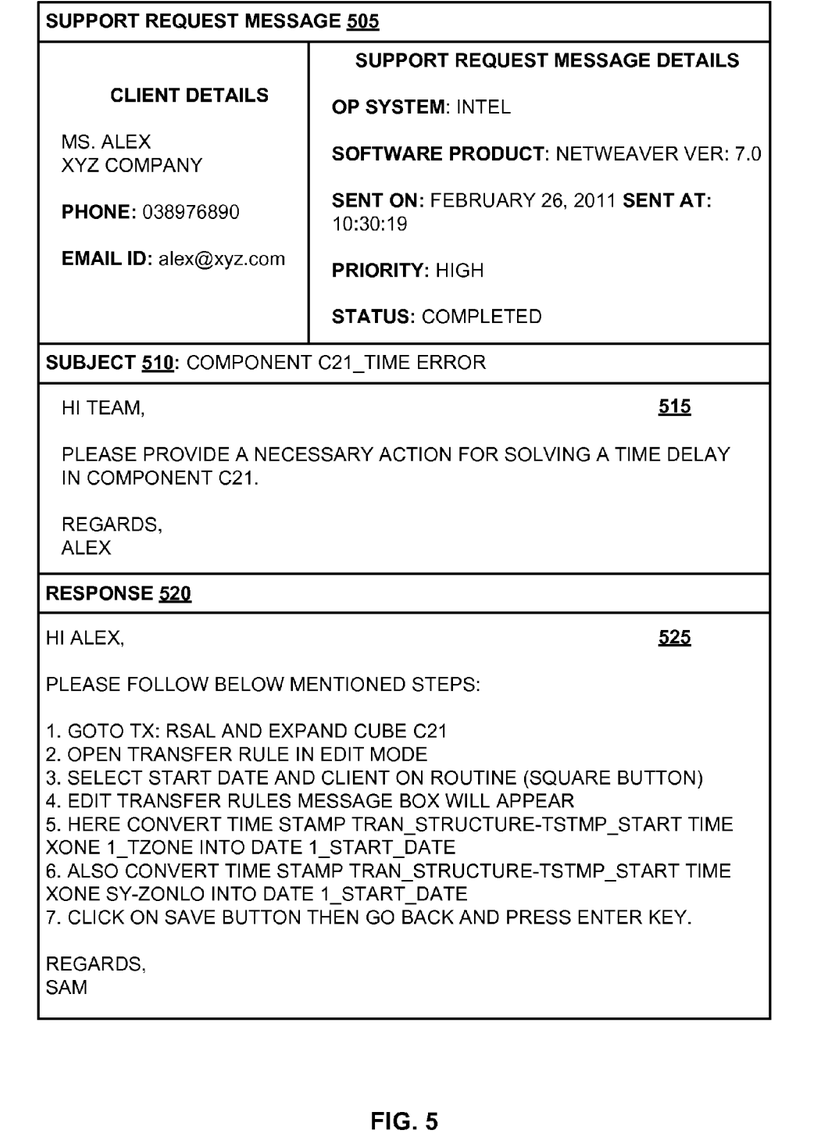
FIG. 5 is an exemplary analogous support request message analogous to the support request message of FIG. 4, according to an embodiment.

At step 320, upon receiving the support request message, a check is made to determine whether the support request repository 310 includes an analogous support request analogous to the support request message. Each prior support request message in the support request repository is checked to find the analogous support request message for the support request message (e.g., 405) using techniques such natural language processing (NLP). An example of the analogous support request message, analogous to the support request message of FIG. 4, is depicted in FIG. 5. With reference to FIG. 5, both the support request message (e.g., 405 of FIG. 4) and analogous support request message 505 are related to a same issue (e.g., time error in component c21) as depicted in subject line (e.g., 420 and 510) and the body of the support request messages (e.g., 425 and 515). Since the analogous support request message 505 is present in the support request repository 310, a response associated with the analogous support request message 505 (e.g., body (e.g., 525) of the response 520) is sent to the client system 305 (e.g., step 325). The process followed when the analogous support request is not present in the support request repository 310 is described in FIG. 6.

Figure 6:
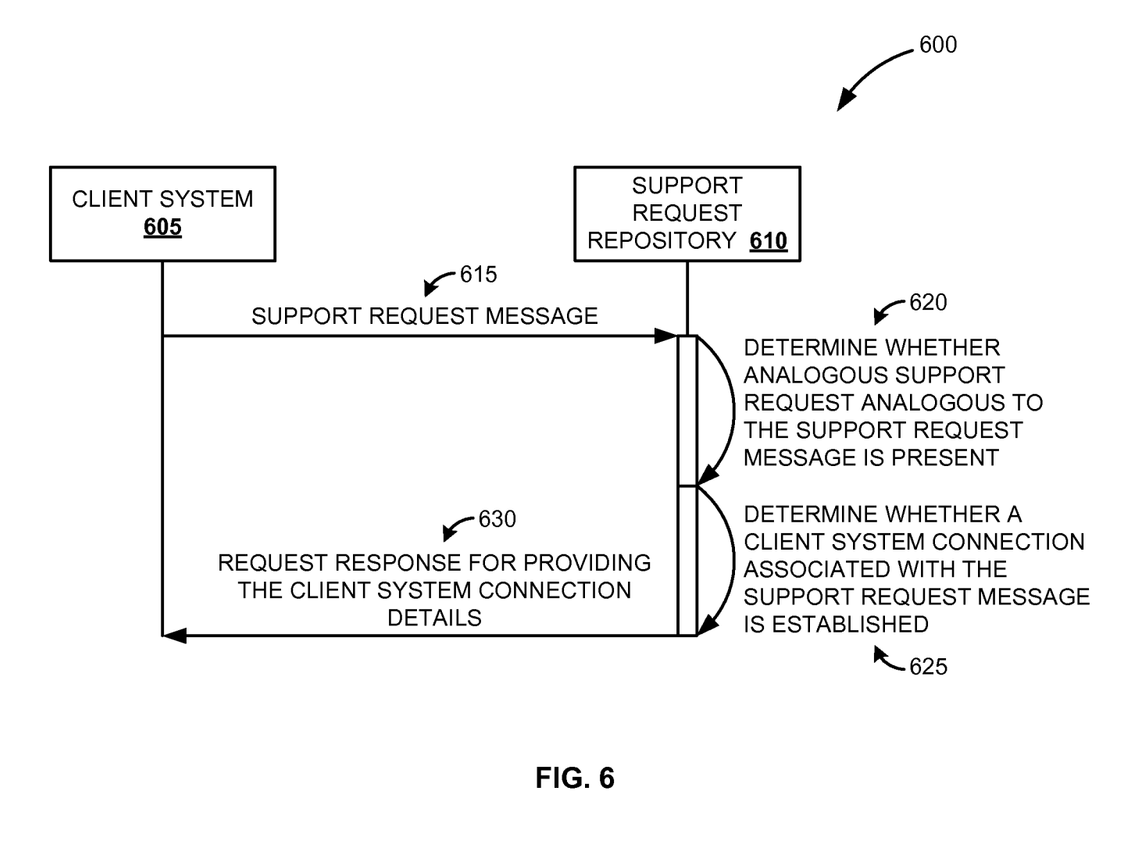
FIG. 6 is a sequence diagram illustrating an exemplary data flow between a client system and a support request repository when analogous support request is not present in the support request repository, according to an embodiment.

FIG. 6 is a sequence diagram 600 illustrating an exemplary data flow between a client system 605 and a support request repository 610 when analogous support request is not present in the support request repository, according to an embodiment. The sequence diagram 600 represents all the interactions and the operations involved between the client system 605 and the support request repository 610. The vertical lines of the client system 605 and the support request repository 610 represent the processes that may exist simultaneously. The horizontal arrows (e.g., 615 and 630) represent the data flow steps between the vertical lines originating from their respective process objects (for e.g., the client system 605 and the support request repository 610). Activation boxes between the horizontal arrows represent the process that is being performed in the respective process object (e.g., 620 and 625).

At step 615, a support request message is sent from the client system 605 to the support request repository 610. Further at step 620, a check is made to determine whether an analogous support request message for the support request message is present in the support request repository 610 as described in FIG. 3. When the analogous support request message is not present in the support request repository 610, a check is made to determine whether a client system connection associated with the support request message is established to allow an escalation support unit to access the client system 605 (e.g., step 625). In one exemplary embodiment, the client system connection includes log-in details of the client system 605. The log-in details may include but are not limited to a system identifier (ID), user ID and password. The support request repository 610 attempts to connect to the client system 605 using the client system connection (e.g., 430 of FIG. 4).

In one embodiment, when the connection to the client system 605 cannot be established with the available system connection details (e.g., 430), a request response for providing the client system connection details is sent (e.g., step 630). The process followed upon receiving the system connection details from the client system 605 or when the connection to the client system 605 is established with the available system connection details (e.g., 430) is described in FIG. 7.

Figure 7:
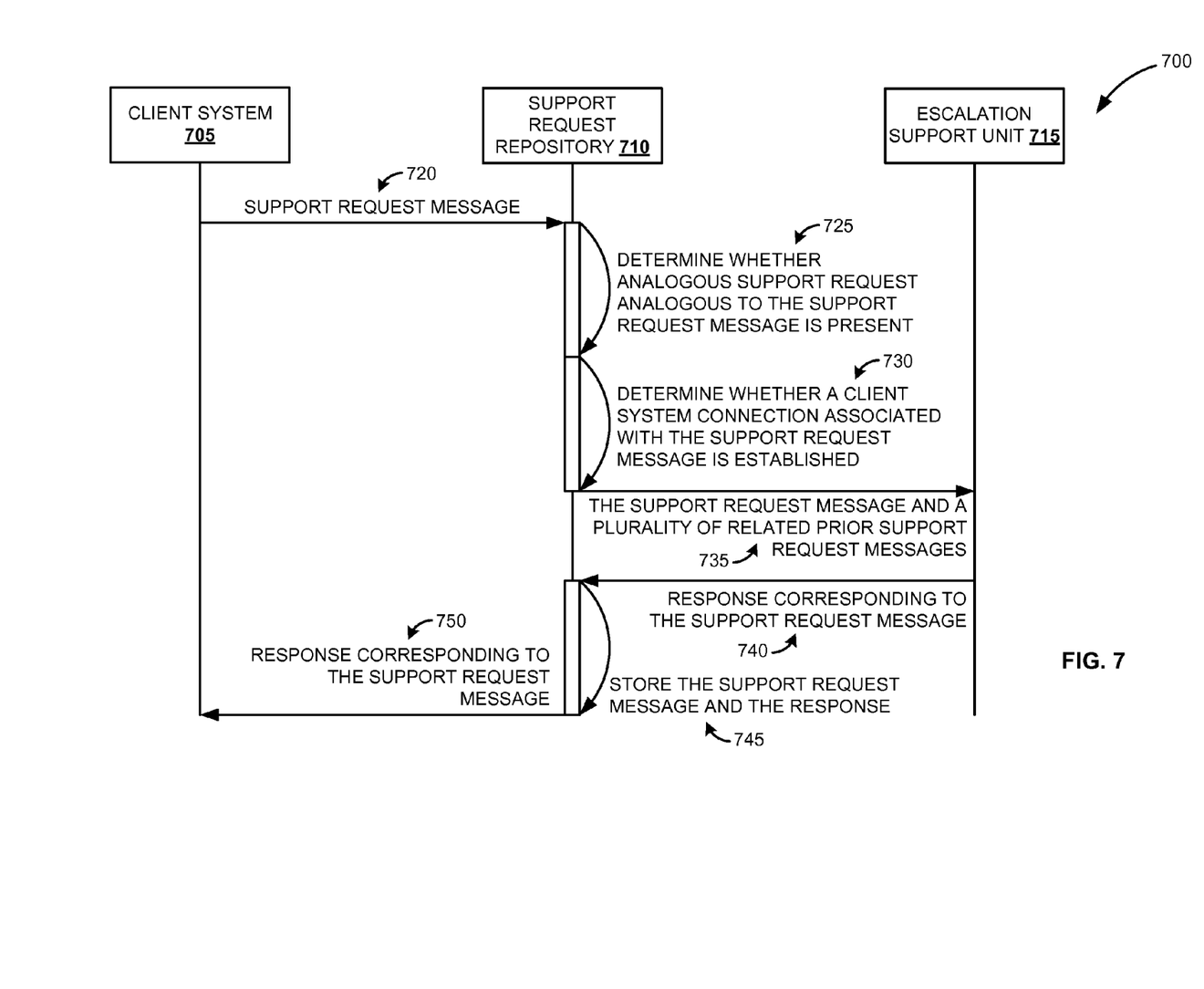
FIG. 7 is a sequence diagram illustrating an exemplary data flow between a client system, a support request repository and an escalation support unit, according to an embodiment.

FIG. 7 is a sequence diagram 700 illustrating an exemplary data flow between a client system 705, a support request repository 710 and an escalation support unit 715, according to an embodiment. The sequence diagram 700 represents all the interactions and the operations involved between the client system 705, a support request repository 710 and the escalation support unit 715. The vertical lines of the client system 705, the support request repository 710 and the escalation support unit 715 represent the processes that may exist simultaneously. The horizontal arrows (e.g., 720, 735, 740 and 750) represent the data flow steps between the vertical lines originating from their respective process objects (for e.g., the client system 705, the support request repository 710 and the escalation support unit 715). Activation boxes between the horizontal arrows represent the process that is being performed in the respective process object (e.g., 725, 730 and 745).

At step 720, a support request message is sent from the client system 705 to the support request repository 710. Further at step 725, a check is made to determine whether an analogous support request message analogous to the support request message is present in the support request repository 710 as described in FIG. 3. At step 730, when the analogous support request message is not present in the support request repository, a check is made to determine whether a client system connection associated with the support request message is established to allow the escalation support unit 715 to access the client system 705.

Figure 8:
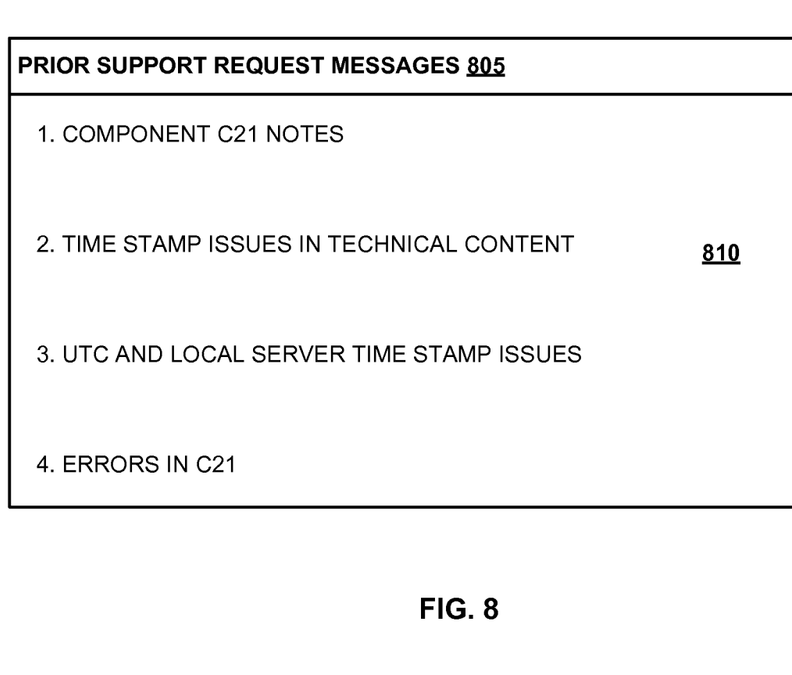
FIG. 8 shows an exemplary user interface presenting related prior support request messages, according to an embodiment.

At step 735, when the client system connection is established, the support request message is sent to the escalation support unit 715 for providing a response to the support request message. Further, a plurality of related prior support request messages corresponding to the support request message are sent to the escalation support unit 715. An example of related prior support request messages is shown in FIG. 8. With reference to FIG. 8, the related prior support request messages 805 include suggestions for providing the response to the support request message (e.g., 405 of FIG. 4). In one exemplary embodiment, the suggestions include subject lines of the related prior support request messages (e.g., 810). Further, the related prior support request messages and the associated responses may be viewed by clicking on the subject line of the related prior support request messages.

In one embodiment, a support associate of the escalation support unit 715 provides the response to the support request message (e.g., 405 of FIG. 4) using the suggestions (e.g., 810). At step 740, the response is sent to the support request repository 710. Further at step 745, the response and the support request message are stored in the support request repository 710 for future reference, and the response is sent to the client system 705 (e.g., step 750). Thereby, the support associates may not respond to same kind of support request messages. Further, client system connection checks are performed without human intervention. Furthermore, by providing the related prior support request messages corresponding to the support request message makes responding to the support request message easy and less time consuming.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
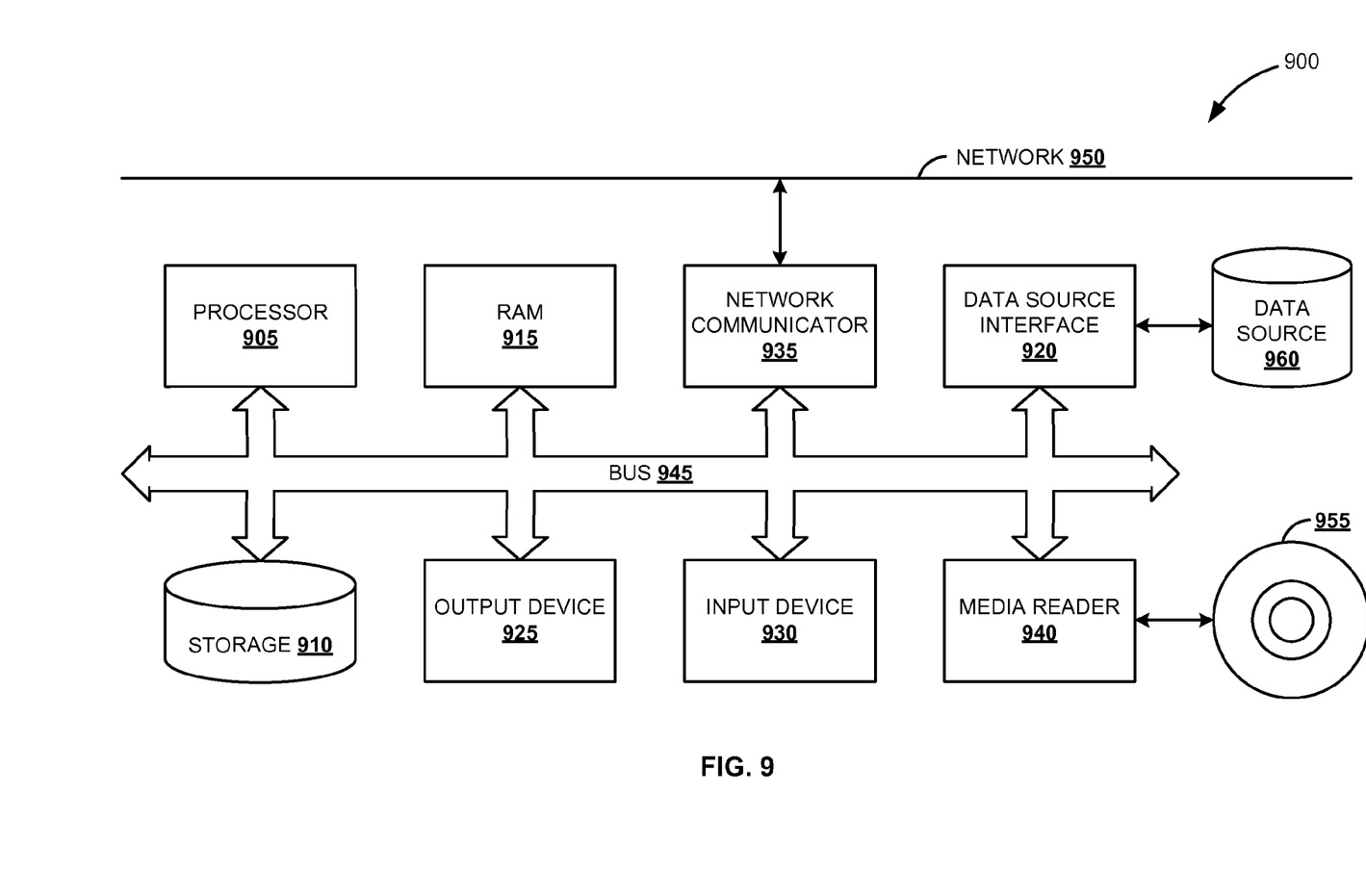
FIG. 9 is a block diagram of a computer system, according to an embodiment.

FIG. 9 is a block diagram of an exemplary computer system 900, according to an embodiment. The computer system 900 includes a processor 905 that executes software instructions or code stored on a computer readable storage medium 955 to perform the above-illustrated methods of the invention. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to physically store instructions, which when executed by a computer, cause the computer to:
   receive a support request message;
   determine whether a support request repository includes an analogous support request message analogous to the received support request message;
   when the analogous support request message is included in the support request repository, send a response associated with the analogous support request message;
   when the analogous support request message is not included in the support request repository, determine whether a client system connection associated with the support request message is established to allow an escalation support unit to access a client system;
   when the client system connection is established, send the support request message, and a plurality of related prior support request messages and associated responses to the escalation support unit;
   receive the response corresponding to the support request message from the escalation support unit; and
   store the support request message and the response in the support request repository.

2. The article of manufacture of claim 1, further comprising instructions, which when executed by the computer, cause the computer to: send the response associated with the support request message to the client system.

3. The article of manufacture of claim 1, wherein the analogous support request in the support request repository is determined using natural language processing (NLP) technique.

4. The article of manufacture of claim 1, further comprising instructions, which when executed by the computer, cause the computer to send a request response for providing client system connection details when the client system connection is not established.

5. The article of manufacture of claim 4, wherein the client system connection details comprises log-in details of the client system.

6. The article of manufacture of claim 1, wherein the support request repository is an in-memory computing database.

7. The article of manufacture of claim 1, wherein the escalation support unit provides the response to the support request message using the plurality of related prior support request messages and the associated responses.

8. A computer implemented method to provide a client system support, the method comprising:
  receiving a support request message;
  a processor of the computer determining whether a support request repository includes an analogous support request message analogous to the received support request message;
  when the analogous support request message is included in the support request repository, sending a response associated with the analogous support request message;
  when the analogous support request message is not included in the support request repository, determining whether a client system connection associated with the support request message is established to allow an escalation support unit to access a client system;
  when the client system connection is established, sending the support request message, and a plurality of related prior support request messages and associated responses to the escalation support unit;
  receiving the response corresponding to the support request message from the escalation support unit; and
  storing the support request message and the response in the support request repository.

9. The computer implemented method of claim 8, further comprising: sending the response associated with the support request message to the client system.

10. The computer implemented method of claim 8, wherein the analogous support request in the support request repository is determined using natural language processing (NLP) technique.

11. The computer implemented method of claim 8, further comprising sending a request response for providing the client system connection details when the client system connection is not established.

12. The computer implemented method of claim 11, wherein the client system connection details comprises log-in details of the client system.

13. The computer implemented method of claim 8, the support request repository is an in-memory computing database.

14. The computer implemented method of claim 8, wherein the escalation support unit provides the response to the support request message using the plurality of related prior support request messages and the associated responses.

15. A computer system to provide a client system support, the computer system comprising a processor, the processor communicating with one or more memory devices storing instructions to:
  receive a support request message;
  determine whether a support request repository includes an analogous support request message analogous to the received support request message;
  when the analogous support request message is included in the support request repository, send a response associated with the analogous support request message;
  when the analogous support request message is not included in the support request repository, determine whether a client system connection associated with the support request message is established to allow an escalation support unit to access a client system;
  when the client system connection is established, send the support request message, and a plurality of related prior support request messages and associated responses to the escalation support unit;
  receive the response corresponding to the support request message from the escalation support unit; and
  store the support request message and the response in the support request repository.

16. The computer system of claim 15, further comprising instructions to: send the response associated with the support request message to the client system.

17. The computer system of claim 15, wherein the analogous support request in the support request repository is determined using natural language processing (NLP) technique.

18. The computer system of claim 15, further comprising instructions to send a request response for providing the client system connection details when the client system connection is not established.

19. The computer system of claim 18, wherein the client system connection details comprises log-in details of the client system.

20. The computer system of claim 15, the support request repository is an in-memory computing database.

* * * * *